United States Patent
Huang

(10) Patent No.: US 7,262,925 B2
(45) Date of Patent: Aug. 28, 2007

(54) IMAGE LENS ARRAY

(75) Inventor: Yeo-Chih Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 67 days.

(21) Appl. No.: 11/253,945

(22) Filed: Oct. 18, 2005

(65) Prior Publication Data

US 2007/0091471 A1    Apr. 26, 2007

(51) Int. Cl.
*G02B 9/00* (2006.01)
*G02B 3/02* (2006.01)
*G02B 13/04* (2006.01)

(52) U.S. Cl. ............... 359/796; 359/713; 359/714; 359/715; 359/716; 359/753

(58) Field of Classification Search ........ 359/713–716, 359/753, 796
See application file for complete search history.

(56) References Cited

U.S. PATENT DOCUMENTS

2004/0264003 A1* 12/2004 Noda ............... 359/716
2005/0002116 A1* 1/2005 Nakamura ............ 359/716
2005/0094292 A1* 5/2005 Cahall et al. ......... 359/785
2005/0270665 A1* 12/2005 Do ..................... 359/716

* cited by examiner

*Primary Examiner*—Scott J. Sugarman
*Assistant Examiner*—DaWayne A Pinkney
(74) *Attorney, Agent, or Firm*—Charles E. Baxley

(57) ABSTRACT

An image lens array, from object side, comprises: a first positive meniscus plastic lens with a convex surface facing forward, a second negative meniscus plastic lens with a concave surface facing forward, a third positive meniscus plastic lens with a convex surface facing forward, and an infrared filter disposed in the lens barrel of the image lens array, the central thickness of the first and second lenses are: CT1<1.0 mm, CT2<0.6 mm. The radius of curvature of the front and back surfaces of the first lens are L1R1 and L1R2 that satisfy the condition as: |L1R1/L1R2|<0.5. The radius of curvature of the front and back surfaces of the third lens are L3R1 and L3R2 that satisfy the condition: |L3R1/L3R2|>0.3.

8 Claims, 4 Drawing Sheets

IMAGE LENS ARRAY

BACKGROUND OF THE INVENTION

1. Field of the Invention

The present invention relates to an image lens array for a small image taking device, and particularly to a mid-aperture type image lens array consisted of three plastic lenses that are provided with aspherical surfaces.

2. Description of the Prior Arts

Since the image pick up lens has an increasingly wide range of application, plus the consumer electronic industrial is growing fast, the small image pick-up lens is accordingly found in great demand in different fields, particularly in photographic cell phone, digital camera, or auto's detection system for parking or other purposes.

A photosensitive element for a digital fixed focus lens array generally includes charge coupled device (CCD) type or CMOS type Complementary Metal Oxide Semiconductor, and its light sensitivity will be reduced sharply with the increase of exit angle of the lens. Therefore, the digital fixed focus lens array is usually provided with telecentric type for prevention of shading problem. However, most of the existing over Megapixel lens arrays are consisted of 3-4 lenses approximately 5.5-7 mm high, these types of lens arrays still have some technical defects as follows:

First, the exit angle of over Megapixel lens array should be reduced, considering the brightness, so that the optical system needs a large space to refract light. Since most of the aforementioned optical systems are 5.5-7 mm high (cannot be reduced further), even if the future pixel is further minimized as a result of further advancement of semiconductor technology, the resolution of the optical systems should be high, thus causing difficulties in making a handy and light lens array.

Second, most of the conventional digital fixed focus lens array employ front aperture to correct aberration, however, the front aperture arrangement will lead to an increase both in stray light and sensitivity of the optical system, substantially complicating the design process.

U.S. Pat. No. 6,441,971B2 discloses a small image lens array with large aperture (f/2.5), the specification of the photosensitive element is ¼ inch while the total length of the image lens array is up to 5.3 mm. As for the existing small image lens array, every 0.1 mm reduction in the total height of the lens array will lead to a substantial degradation of the resolution quality.

The present invention has arisen to mitigate and/or obviate the afore-described disadvantages.

SUMMARY OF THE INVENTION

The primary objective of the present invention is to provide a minimized image lens array comprising a first positive meniscus plastic lens with a convex surface facing forward, a second negative meniscus plastic lens with a concave surface facing forward, a third positive meniscus plastic lens with a convex surface facing forward, and an infrared filter disposed in the lens barrel of the image lens array, wherein the central thickness of the first and second lenses are: $CT1<1.0$ mm, $CT2<0.6$ mm. By such arrangements, the size of the image lens array of the present invention can be reduced effectively, and meanwhile, the resolution can be improved.

The second objective of the present invention is to provide an image lens array having improved image-forming quality, wherein the radius of curvature of the front and back surfaces of the first lens are L1R1 and L1R2 that satisfy the condition as: $|L1R1/L1R2|<0.5$. The radius of curvature of the front and back surfaces of the third lens are L3R1 and L3R2 that satisfy the condition as: $|L3R1/L3R2|>0.3$. By such arrangements, the image lens array can be improved in resolution.

The third objective of the present invention is to provide an image lens array capable of suppressing stray light, with the aperture disposed between the first and second lenses.

The present invention will become more obvious from the following description when taken in connection with the accompanying drawings, which show, for purpose of illustrations only, the preferred embodiments in accordance with the present invention.

Table 1 shows the optical data of the first embodiment of the present invention; and Table 2 shows the optical data of the second embodiment of the present invention.

DETAILED DESCRIPTION OF THE PREFERRED EMBODIMENTS

Figure 1:
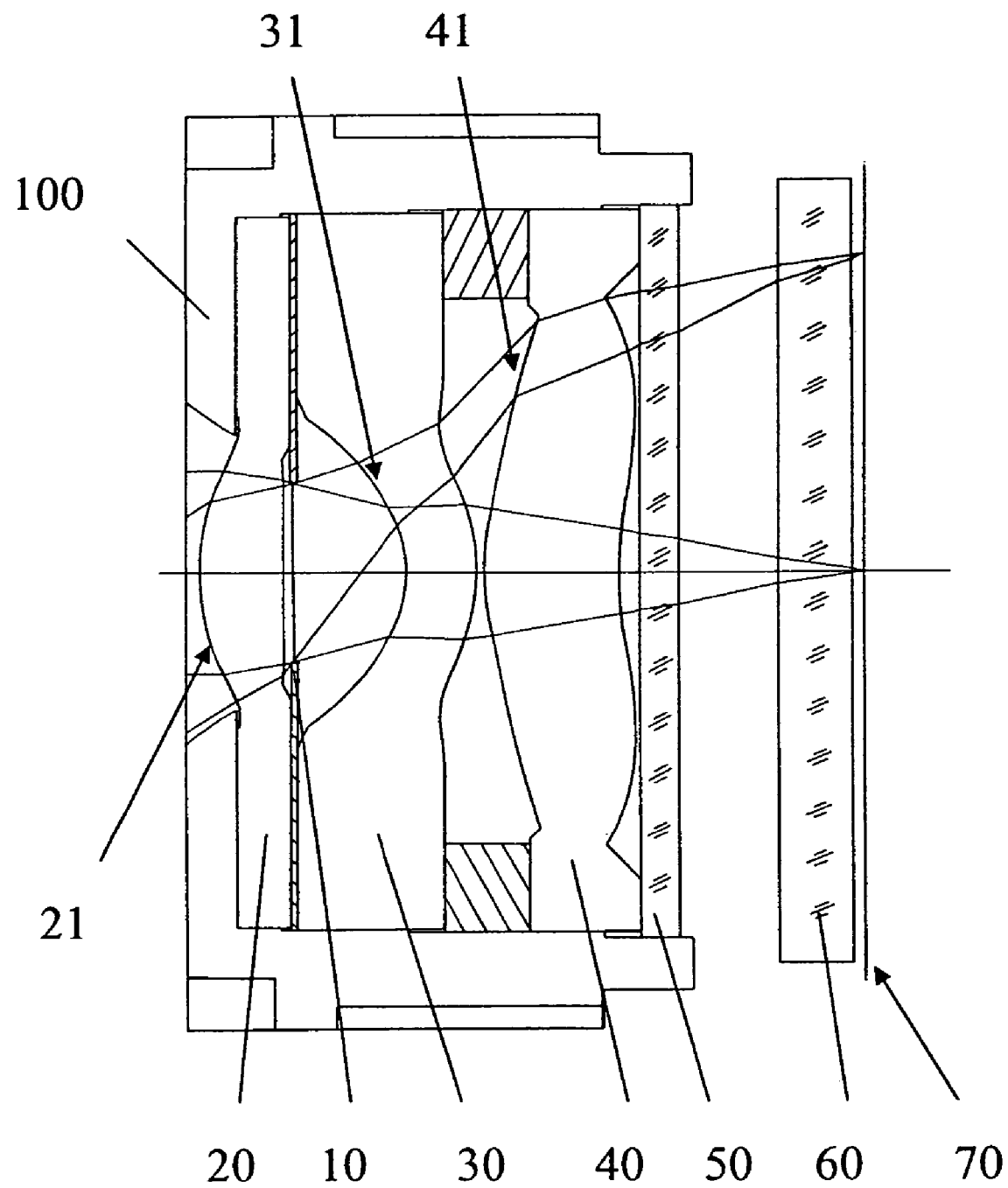
FIG. 1 is an illustrative view of an image lens array in accordance with a first embodiment of the present invention.

Referring to FIG. 1, an image lens array 100 in accordance with a first embodiment of the present invention, from the object side, comprises a first lens 20, an aperture 10, a second lens 30, a third lens 40, an infrared filter 50, a sensor cover glass 60 and an image-forming plane 70.

The first lens 20 is a meniscus lens with positive refracting power and has a convex surface 21 facing forward so as to balance the astigmatic aberration and field curvature caused in the optical system.

The second lens 30 is a negative meniscus lens with a concave surface 31 facing forward.

The third lens 40 is a positive lens with a convex surface 41 facing forward.

The infrared filter 50 is a flat glass that does not affect the focal length of the optical system.

The sensor cover glass 60 is also a flat glass that does not affect the focal length of the optical system.

The first lens 20 is made of plastic material and its radius of curvature of front and back surfaces is L1R1 and L1R2 that satisfy the equation as: $|L1R1/L1R2|<0.5$. The focal length f1 of the first lens and the focal length of the entire image lens array (the optical system) f satisfy the equation as: $1.0<|f/f1|<1.5$. The central thickness CT1 of the first lens $CT1<1.0$ mm, Abbe number $v1>45$ and the conic coefficient of the front surface of the first lens is: $L1k1<0$.

The second lens 30 is also made of plastic material. The relation of the focal length f2 of the second lens with respect to the focal length f of the optical system is: $0.7<|f/f2|<1.2$, the central thickness CT2 of the second lens is less than 0.6 mm ($CT2<0.6$ mm), and the Abbe number of the second lens is: $v2<45$.

The third lens is made of plastic material and its radius of curvature of front and back surfaces is L3R1 and L3R2 that satisfy the equation as: |L3R1/L3R2|>0.3. The conic coefficient k value of the front surface of the third lens 40 is: L3k1<−5, and the relation of the focal length f3 of the third lens 40 to the focal length f satisfy the equation as: 0.3<|f/f3|<1.2.

The respective lenses of the present invention have aspherical surfaces, the aperture 10 is disposed between the first lens 20 and the second lens 30, and the infrared filter 50 is included in the lens barrel.

The distance between the aperture 10 and the image-forming plane 70 is d, and the image height of the optical system is h, they satisfy the following equation: 1.15<|d/h|<2.5.

Figure 3:
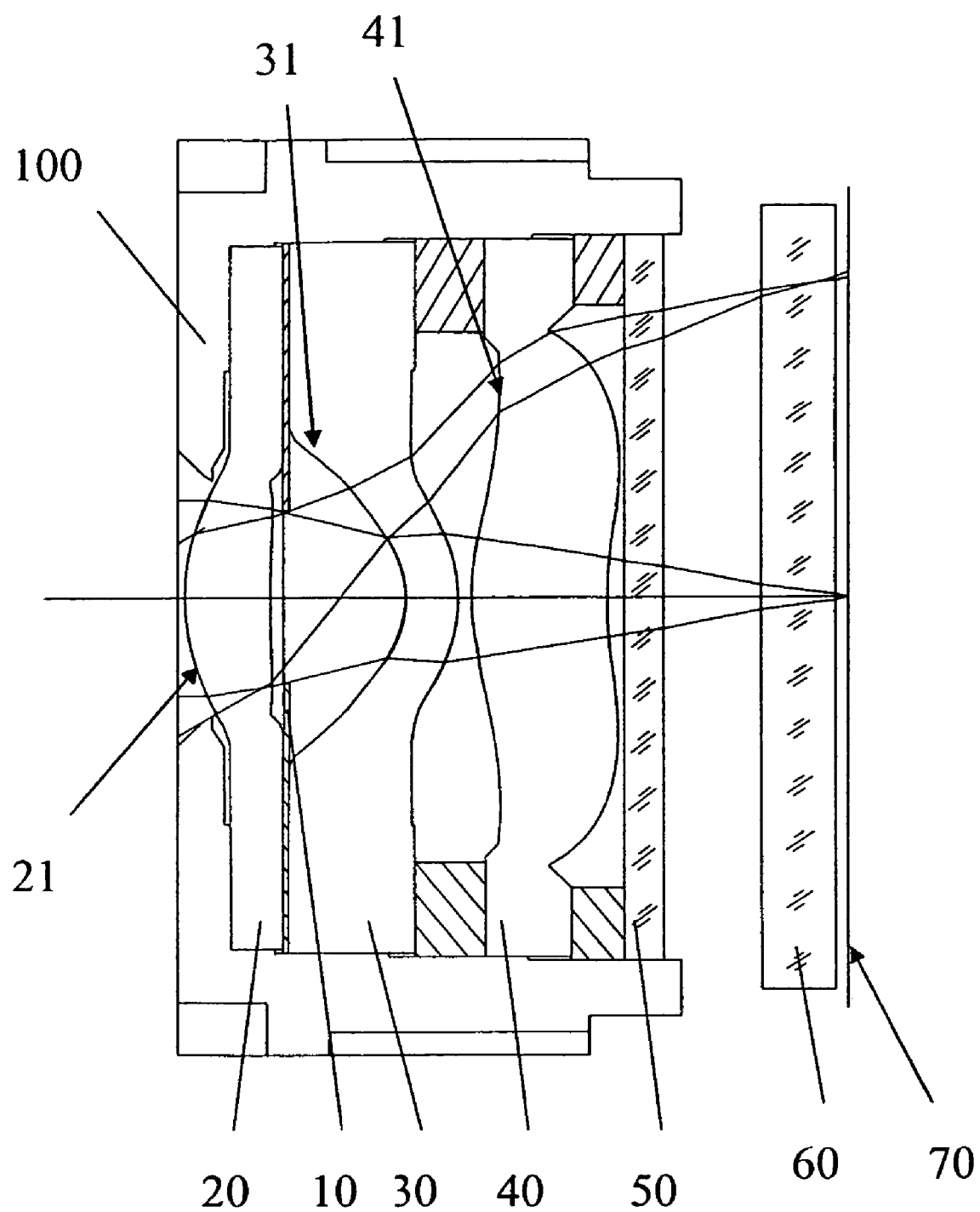
FIG. 3 is an illustrative view of an image lens array in accordance with a second embodiment of the present invention.

Referring to FIG. 3, an image lens array 100 in accordance with the second embodiment of the present invention, from the object side, comprises a first lens 20, an aperture 10, a second lens 30, a third lens 40, an infrared filter 50, a sensor cover glass 60 and an image-forming plane 70.

The first lens 20 is a meniscus lens with positive refracting power and has a convex surface 21 facing forward.

The second lens 30 is a negative meniscus lens with a concave surface 31 facing forward.

The third lens 40 is a positive lens with a convex surface 41 facing forward. The first, second and third lenses 20, 30, 40 are provided with aspherical surfaces.

The infrared filter 50 and the sensor cover glass 60 are a flat glass that does not affect the focal length of the optical system. The image-forming effect of the optical system is achieved by the first, second and third lenses 20, 30, and 40.

Figure 4:
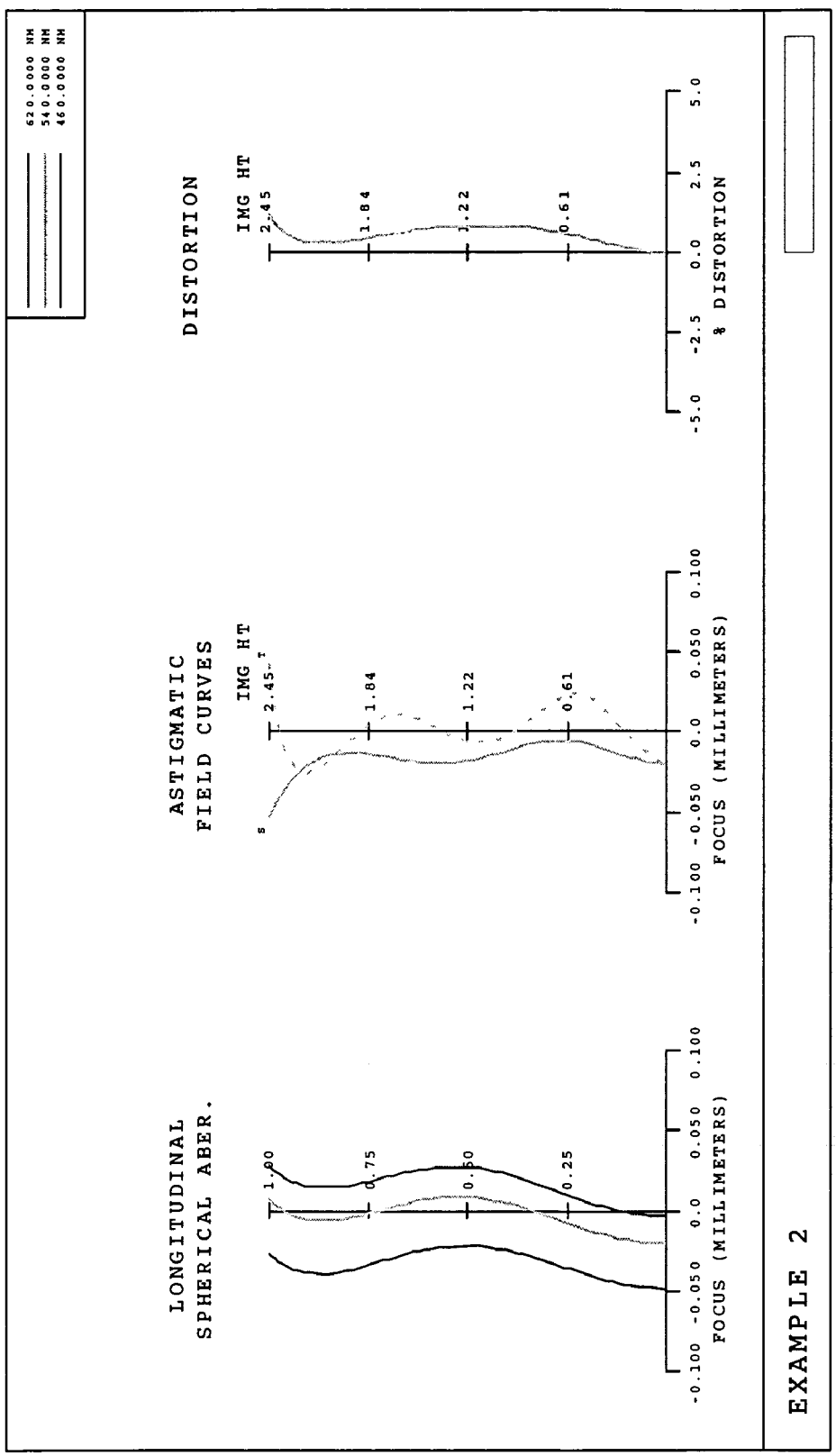
FIG. 4 is a curve diagram for showing the aberration correction of the second embodiment of the present invention.

The optical data of the second embodiment image lens array is shown in table 2. The central thickness of the second lens 30: CT2<0.45 mm, and the Abbe number of the second lens is: v2<29. In addition, FIG. 4 shows the aberration correction of the second embodiment.

The image forming function of the first embodiment is achieved by the first, second and third lenses 20, 30, and 40, and the respective optical data is shown in Table 1.

The aspheric curves of each surface of lens should satisfy the following equation:

$$X(Y)=(Y^2/R)/(1+\sqrt{1-(1+k)*(Y/R)^2})+A_4*Y^4+A_6*Y^6+ \ldots$$

X: the cross sectional distance of the lens

Y: represents a height of a point on the aspherical surface with respect to the optical axis k: conic coefficient k=0: sphere surface k<−1: hyper-bolid surface k>0: oblate spheroid surface $A_4$, $A_6$ . . . are aspherical coefficients for fourth, sixth . . . order terms, The radius of curvature of the front and back surface of the first lens 20 is L1R1 and L1R2, and they are formed to satisfy the condition as: |L1R1/L1R2|<0.5, which can efficiently reduce the spherical aberration. The radius of curvature of the front and back surface of the third lens 40 is L3R1 and L3R2, and they are formed to satisfy the condition as: |L3R1/L3R2|>0.3, such that the off axis aberration can be reduced efficiently.

The aperture 10 is disposed between the first lens 20 and the second lens 30, and unlike the conventional prior art, the aperture is located behind, instead of in front of, the first lens 20, so as to suppress the stray light.

The conic coefficient k value L1k1 of the front surface 21 of the first lens 20 and the k value L3k1 of the front surface 41 of the third lens 40 are controlled to satisfy the conditions:

$$L1k1<0$$

$$L3k1<-5$$

through these conditions, the stray light can be further eliminated.

The focal length f1 of the first lens 20, the focal length f2 of the second lens 30, the focal length f3 of the third lens 40, and the focal length f of the optical system are controlled to satisfy the conditions:

$$1.5>|f/f1|>1.0$$

$$1.2>|f/f2|>0.7$$

$$1.2>|f/f3|>0.3$$

so that the chromatic aberration of the lens array can be reduced.

The central thickness CT1 of the first lens 20 and the central thickness CT2 of the second lens 30 satisfy the following conditions:

$$CT1<1.0 \text{ mm}$$

$$CT2<1.6 \text{ mm}$$

so as to effectively correct the astigmatism aberration and reduce the height of the image lens array.

Furthermore, the image lens array 100 further includes an infrared filter 50 disposed behind the third lens 40. Unlike the conventional art, the infrared filter 50 is disposed inside, instead of outside the lens barrel of the image lens array 100, so as to make the image lens array 100 short.

The Abbe number v1 of the first lens 20 and the Abbe number v2 of the second lens 30 satisfy the following conditions so as to correct the chromatic aberration:

$$v1>45 \quad v2<45$$

Abbe number: $V=(N_d-1)/(N_f-N_c)$ $N_d$, $N_f$, $N_c$ are the indices of refraction for the helium D line (587.6 nm), the hydrogen F line (486.1 nm) and the hydrogen C line (656.3 nm).

$\Delta N=N_f-N_c$ is a measure of the dispersion $\Delta N_d-1$ represents the refracting power of the material In the image lens array 100, the distance between the aperture 10 and the image-forming plane 70 is d, the image height of the optical system is h, and they are controlled to satisfy the condition as follows:

$$1.15<|d/h|<2.5$$

so as to keep the incident angle of the light to the photosensitive element within an acceptable limit.

Figure 2:
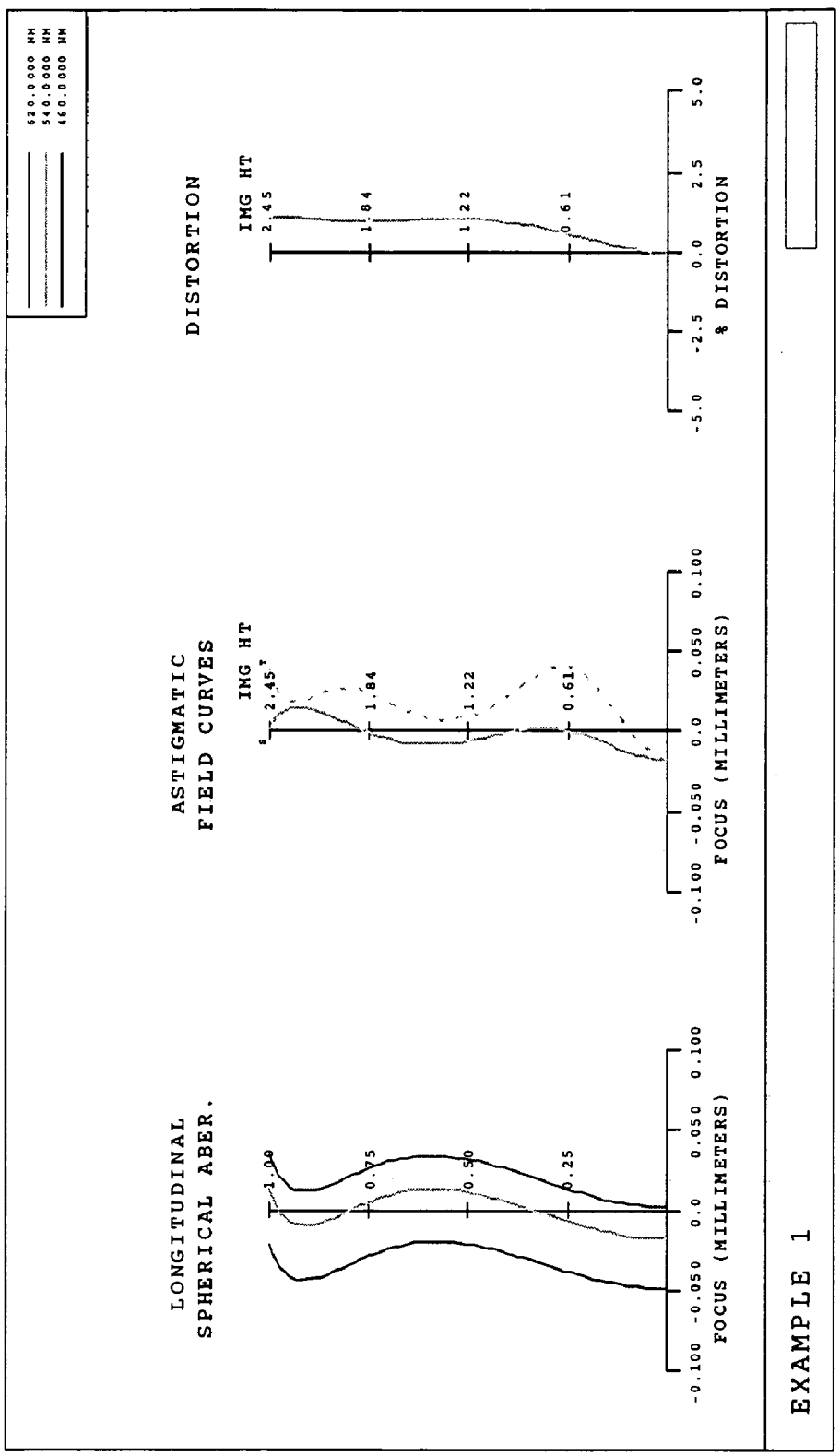
FIG. 2 is a curve diagram for showing the aberration correction of the first embodiment of the present invention.

FIG. 2 is a curve diagram for showing the aberration correction of the first embodiment of the present invention. Based on the aforementioned structure and arrangements, the height of the image lens array 100 of the present invention can be reduced to below 5 mm, and at the same time, the resolution can be improved.

It is to be noted that the data as shown in table 1 is for reference only and subject to change depending upon the structure, arrangement and other conditions of the image lens array.

In the second embodiment, the central thickness of the second lens 30: CT2<0.45 mm and its Abbe number: v2<29, such that the astigmatic aberration and chromatic aberration can be further reduced. Since the characteristics and work principle of the second embodiment are the same as that of the first embodiment, further remarks on these matters will be omitted.

Based on the aforementioned structure, data and arrangements of the image lens array, the present invention can achieve the following objectives:

First, improved image-forming quality, big aperture and low cost.

Second, effectively reducing the height of the image lens array, and the distance from the front end of the image lens array to the image-forming plane is approximately 5 mm when the size of the photosensitive element used is ¼ inch.

Third, effectively suppressing the stray light while improving production stability.

While we have shown and described various embodiments in accordance with the present invention, it should be clear to those skilled in the art that further embodiments may be made without departing from the scope of the present invention.

TABLE 1

Optical data of the first embodiment

| Surf # |  | RDY | THI | Material | Index | Abbe # | Focal length |
|---|---|---|---|---|---|---|---|
| 0 | OBJECT | PLANO | 1000 |  |  |  |  |
| 1 | Lens 1 | 1.6806 | 0.623 | Plastic | 1.543 | 60.3 | 3.38 |
| 2 |  | 16.2220 | 0.078 |  |  |  |  |
| 3 | APE. STOP | PLANO | 0.843 |  |  |  |  |
| 4 | Lens 2 | −0.8336 | 0.53 | Plastic | 1.583 | 30.2 | −4.79 |
| 5 |  | −1.4628 | 0.05 |  |  |  |  |
| 6 | Lens 3 | 1.6237 | 1.027 | Plastic | 1.530 | 55.8 | 5.29 |
| 7 |  | 2.9897 | 0.2 |  |  |  |  |
| 8 | IR-cut filter | PLANO | 0.3 | Glass | 1.517 | 64.2 | — |
| 9 |  | PLANO | 0.5 |  |  |  |  |
| 10 | Cover Glass | PLANO | 0.55 | Glass | 1.517 | 64.2 | — |
| 11 |  | PLANO | 0.281 |  |  |  |  |
| 12 | IMAGE | PLANO | 0.018 |  |  |  |  |

| Surf # | R | K | A4 | A6 | A8 | A10 | A12 |
|---|---|---|---|---|---|---|---|
| 1 | 1.6806 | −1.40272E+00 | 1.69527E−02 | 2.70237E−02 | −5.37047E−02 | — | — |
| 2 | 16.2220 | −1.00000E+00 | −4.09853E−02 | 5.90905E−02 | −2.53117E−01 | 1.89863E−01 | — |
| 4 | −0.8336 | −2.32174E+00 | −5.93151E−03 | −4.60123E−01 | 1.33226E+00 | −1.48692E+00 | 5.22145E−01 |
| 5 | −1.4628 | −1.00179E+00 | −7.47250E−02 | 1.83940E−01 | −1.92376E−02 | −1.49923E−02 | — |
| 6 | 1.6237 | −1.32531E+01 | −2.33717E−02 | 1.55497E−02 | −4.55574E−03 | 7.05462E−04 | −4.62062E−05 |
| 7 | 2.9897 | −5.58086E+00 | −6.66982E−02 | 1.59954E−02 | −2.98388E−03 | 2.77095E−04 | −7.72424E−06 |

Focal length of the image lens array: f = 3.75 mm, F NO. = 2.4, HFOV = 30.5 deg
The first lens: |f/f1| = 1.109, | L1R1/L1R2 | = 0.104, CT1 = 0.623 mm, v1 = 60.3, L1k1 = −1.40272
The second lens: |f/f2| = 0.783, CT2 = 0.53 mm, v2 = 30.2
The third lens: |f/f3| = 0.709, | L3R1/L3R2 | = 0.543, L3k1 = −13.2531 | d/h | = 1.919

TABLE 2

Optical data of the second embodiment

| Surf # |  | RDY | THI | Material | Index | Abbe # | Focal length |
|---|---|---|---|---|---|---|---|
| 0 | OBJECT | PLANO | 1000 |  |  |  |  |
| 1 | Lens 1 | 1.6703 | 0.637 | Plastic | 1.543 | 60.3 | 3.51 |
| 2 |  | 11.2443 | 0.1 |  |  |  |  |
| 3 | APE. STOP | PLANO | 0.913 |  |  |  |  |
| 4 | Lens 2 | −0.7216 | 0.4 | Plastic | 1.607 | 26.6 | −4.32 |
| 5 |  | −1.2006 | 0.1 |  |  |  |  |
| 6 | Lens 3 | 1.5400 | 1.04 | Plastic | 1.530 | 55.8 | 4.50 |
| 7 |  | 3.3022 | 0.13 |  |  |  |  |
| 8 | IR-cut filter | PLANO | 0.3 | Glass | 1.517 | 64.2 | — |
| 9 |  | PLANO | 0.735 |  |  |  |  |
| 10 | Cover Glass | PLANO | 0.55 | Glass | 1.517 | 64.2 | — |
| 11 |  | PLANO | 0.075 |  |  |  |  |
| 12 | IMAGE | PLANO | 0.02 |  |  |  |  |

| Surf # | R | K | A4 | A6 | A8 | A10 | A12 | A14 |
|---|---|---|---|---|---|---|---|---|
| 1 | 1.6703 | −6.62457E−01 | 2.91792E−03 | 2.00652E−02 | −3.95583E−02 | — | — |  |
| 2 | 11.2443 | — | −1.86275E−02 | −4.71685E−02 | — | — | — |  |
| 4 | −0.7216 | −3.27699E+00 | −3.85812E−01 | 1.11456E−01 | 7.69132E+00 | −8.59552E−01 | 1.91387E−01 |  |
| 5 | −1.2006 | −1.00000E+00 | −7.75024E−02 | 6.65561E−02 | 1.77287E−01 | −8.90984E−02 | — |  |

TABLE 2-continued

| | | | Optical data of the second embodiment | | | | | |
|---|---|---|---|---|---|---|---|---|
| 6 | 1.5400 | −1.28596E+01 | −4.37039E−02 | 1.79834E−02 | −3.95876E−03 | 9.14730E−05 | 4.93067E−05 | |
| 7 | 3.3022 | −9.23018E−01 | −9.10671E−02 | 2.02114E−02 | −4.92941E−03 | 6.21712E−04 | −2.49903E−05 | |
| 7 | | | | | | | | −4.88164E−06 |

Focal length of the image lens array: f = 3.78 mm, F NO. = 2.4, HFOV = 31.1 deg
The first lens: |f/f1| = 1.077, | L1R1/L1R2 | = 0.149, CT1 = 0.637 mm, v1 = 60.3, L1k1 = −0.66246
The second lens: |f/f2| = 0.875, CT2 = 0.4 mm, v2 = 26.6
The third lens: |f/f3| = 0.840, | L3R1/L3R2 | = 0.466, L3k1 = −12.8596, | d/h | = 1.858

What is claimed is:

1. An image lens array, from object side to image side, comprising: a first lens, a second lens, and a third lens; wherein
   the first lens with positive refracting power has a front convex surface and a back concave surface, a radius of curvature of the front convex surface and that of the back concave surface of the first lens are: L1R1 and L1R2 that satisfy an equation as: |L1R1/L1R2|<0.5, the first lens is provided with aspherical surface;
   an aperture is arranged behind the first lens, for controlling brightness of the image lens array;
   the second lens having a front concave surface and a back convex surface, is located behind the aperture and has a negative refracting power, and the second lens is also provided with aspherical surface; and
   the third lens with a front convex surface and a back concave surface, is located behind the second lens and has a positive power, a radius of curvature of the front convex surface and that of the back concave surface of the third lens are: L3R1 and L3R2 that satisfy an equation as: |R3R1/L3R2|>0.3, the third lens is provided with aspherical surface;
   focal lengths of the first, second and third lenses are: f1, f2 and f3, and a focal length of the image lens array is f, these four focal lengths are controlled to satisfy the following conditions:

$1.5 > |f/f1| > 1.0$ $1.2 > |f/f2| > 0.7$ $1.2 > |f/f3| > 0.3$.

2. The image lens array as claimed in claim 1 wherein central thickness of the first and second lenses are CT1 and CT2 that satisfy the following conditions:

$CT1 < 1.0$ mm $CT2 < 0.6$ mm.

3. The image lens array as claimed in claim 1 further comprising an infrared filter disposed behind the third lens.

4. The image lens array as claimed in claim 1, wherein Abbe numbers of the first and second lenses are v1 and v2, and they satisfy the following conditions:

$v1 > 45$ $v2 < 45$.

5. The image lens array as claimed in claim 1, wherein a distance from the aperture to an image plane of the image lens array is d, and a image height of the image lens array is h, they satisfy the following condition:

$1.15 < |d/h| < 2.5$.

6. The image lens array as claimed in claim 1, wherein the conic coefficient k values of the front surfaces of the first and the third lenses are: L1k1 and L3k1, and they satisfy the following conditions:

$L1k1 < 0$ $L3k1 < −5$.

7. The image lens array as claimed in claim 1, wherein Abbe number v2 of the second lens satisifies the condition: $v2 < 29$.

8. The image lens array as claimed in claim 3, wherein the central thickness of the second lens satisfies the following condition: $CT2 < 0.45$ mm.

* * * * *

UNITED STATES PATENT AND TRADEMARK OFFICE
CERTIFICATE OF CORRECTION

| | | |
|---|---|---|
| PATENT NO. | : 7,262,925 B2 | Page 1 of 1 |
| APPLICATION NO. | : 11/253945 | |
| DATED | : August 28, 2007 | |
| INVENTOR(S) | : Yeo-Chih Huang et al. | |

It is certified that error appears in the above-identified patent and that said Letters Patent is hereby corrected as shown below:

On the Title Page, please add under Item (30) "Foreign Application Priority Data"

-- May 5, 2005  (TW)   20050114565 --.

In the Specification

In Column 1, Line 3, please add

-- CLAIM TO PRIORITY AND RELATED APPLICATIONS

This patent document claims priority to Taiwan Patent Application No. TW20050114565 filed on May 5, 2005. --.

Signed and Sealed this
Fifteenth Day of September, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 7,262,925 B2 | Page 1 of 1 |
| APPLICATION NO. | : 11/253945 | |
| DATED | : August 28, 2007 | |
| INVENTOR(S) | : Yeo-Chih Huang et al. | |

It is certified that error appears in the above-identified patent and that said Letters Patent is hereby corrected as shown below:

On the Title Page, in item (12), "Huang" should read -- Huang et al. --.

On the Title Page, in item (75), under "Inventor," add

-- Hsiang-Chi Tang, Taichung City (TW) --.

Signed and Sealed this
Fifteenth Day of March, 2016

Michelle K. Lee
*Director of the United States Patent and Trademark Office*